United States Patent
Richards et al.

(10) Patent No.: US 10,299,135 B2
(45) Date of Patent: May 21, 2019

(54) FILLING EMPTY SYMBOLS IN CELLULAR COMMUNICATIONS NETWORK TRANSMISSIONS IN UNLICENSED SPECTRUM

(71) Applicant: Telefonaktiebolaget L M Ericsson (publ), Stockholm (SE)

(72) Inventors: Christopher Richards, Ottawa (CA); Michael Petras, Ottawa (CA); Jung-Fu Cheng, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 72 days.

(21) Appl. No.: 14/432,256

(22) PCT Filed: Feb. 10, 2015

(86) PCT No.: PCT/IB2015/051000
§ 371 (c)(1),
(2) Date: Mar. 30, 2015

(87) PCT Pub. No.: WO2016/097880
PCT Pub. Date: Jun. 23, 2016

(65) Prior Publication Data
US 2016/0183097 A1   Jun. 23, 2016

Related U.S. Application Data

(60) Provisional application No. 62/094,730, filed on Dec. 19, 2014.

(51) Int. Cl.
*H04W 16/14* (2009.01)
*H04W 74/08* (2009.01)
(Continued)

(52) U.S. Cl.
CPC ............ *H04W 16/14* (2013.01); *H04L 5/001* (2013.01); *H04L 27/0006* (2013.01);
(Continued)

(58) Field of Classification Search
CPC ..... H04W 72/04; H04W 76/02; H04W 16/10; H04W 28/16; H04W 16/14;
(Continued)

(56) References Cited

U.S. PATENT DOCUMENTS

2005/0190822 A1*  9/2005  Fujii .................. H04B 7/15585
                                                            375/211
2011/0128942 A1*  6/2011  Kim ..................... H04B 7/0639
                                                            370/336
(Continued)

FOREIGN PATENT DOCUMENTS

EP      2696530 A2    2/2014
GB      2287384 A  *  9/1995  ............. H04H 20/18

OTHER PUBLICATIONS

AT&T, "RP-131701: Drivers, Benefits and Challenges for LTE in Unlicensed Spectrum," 3rd Generation Partnership Project (3GPP), TSG-RAN Meeting #62, Dec. 3-6, 2013, 3 pages, Busan, Korea.
(Continued)

*Primary Examiner* — Kamran Afshar
*Assistant Examiner* — Farid Seyedvosoghi
(74) *Attorney, Agent, or Firm* — Withrow & Terranova, PLLC

(57) ABSTRACT

Systems and methods relating to coexistence of a cellular communications network technology (e.g., Long Term Evolution (LTE)) and another wireless technology (e.g., WiFi) in a shared unlicensed spectrum are disclosed. In particular, the present disclosure provides systems and methods that mitigate or avoid grabbing of an unlicensed, or shared, frequency band utilized by a wireless communications network
(Continued)

node by a node of another wireless technology that operates according to a listen-before-talk scheme.

17 Claims, 18 Drawing Sheets

(51) Int. Cl.
  *H04L 27/00* (2006.01)
  *H04L 27/26* (2006.01)
  *H04L 5/00* (2006.01)
(52) U.S. Cl.
  CPC ..... *H04L 27/2601* (2013.01); *H04W 74/0808* (2013.01); *H04L 5/005* (2013.01); *H04L 5/0053* (2013.01)
(58) Field of Classification Search
  CPC .............. H04W 74/0808; H04W 24/10; H04L 27/0006; H04L 27/2601; H04L 5/001; H04L 5/005; H04L 5/0053
  USPC ......... 455/435, 435.2, 435.3, 447, 450, 451, 455/452.1, 452.2, 453, 454; 370/346, 370/347, 348, 349, 329, 336, 454
  See application file for complete search history.

(56) References Cited

U.S. PATENT DOCUMENTS

| | | | | |
|---|---|---|---|---|
| 2014/0044105 A1* | 2/2014 | Bontu | ............... | H04L 5/001 370/336 |
| 2015/0223244 A1* | 8/2015 | Tabet | ................... | H04W 72/12 370/329 |
| 2016/0135172 A1* | 5/2016 | Sun | ...................... | H04L 5/0007 370/329 |

OTHER PUBLICATIONS

Liu, Feilu, et al., "A Framework for Femtocells to Access Both Licensed and Unlicensed Bands," International Symposium on Modeling and Optimization in Mobile, Ad Hoc and Wireless Networks (WiOpt), May 9-13, 2011, Princeton, New Jersey, IEEE, pp. 1-25.

Qualcomm, et al., "RP-131635: Introducing LTE in Unlicensed Spectrum," 3rd Generation Partnership Project (3GPP), RAN #62, Dec. 3-7, 2013, 8 pages, Busan, South Korea.

International Search Report and Written Opinion for International Patent Application No. PCT/IB2015/051000, dated Sep. 11, 2015, 12 pages.

Debasish Mitra, "Co-ordinated Multi point transmission and reception—3GPP Rel 11," retrieved from http://letsliveprotocol.blogspot.com/2013/12/co-ordinated-multi-point-transmission.html on Mar. 19, 2015, Dec. 29, 2013, 2 pages.

International Preliminary Report on Patentability for International Patent Application No. PCT/IB2015/051000, dated Apr. 3, 2017, 7 pages.

* cited by examiner

| | SUBFRAME 0 | SUBFRAME 1 | SUBFRAME 2 | SUBFRAME 3 | SUBFRAME 4 | SUBFRAME 5 | SUBFRAME 6 | SUBFRAME 7 | SUBFRAME 8 | SUBFRAME 9 |
|---|---|---|---|---|---|---|---|---|---|---|
| PRB 5 | FIG. 8B | | FIG. 8D | | FIG. 8F | | FIG. 8H | | FIG. 8J | |
| PRB 4 | | | | | | | | | | |
| PRB 3 | | | | | | | | | | |
| PRB 2 | FIG. 8A | | FIG. 8C | | FIG. 8E | | FIG. 8G | | FIG. 8I | |
| PRB 1 | | | | | | | | | | |
| PRB 0 | | | | | | | | | | |

*FIG. 8*

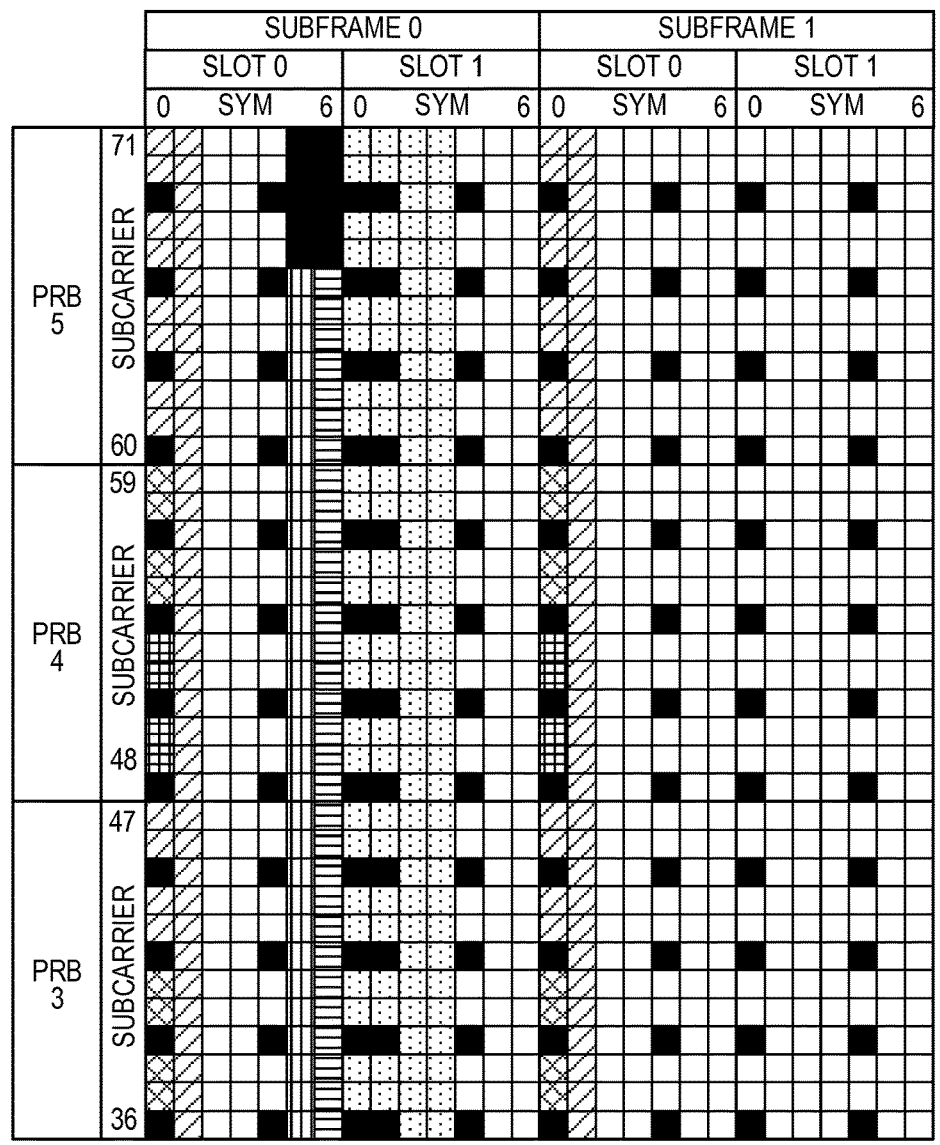

PSCH (PRIMARY SYNCHRONIZATION CHANNEL)
SSCH (SECONDARY SYNCHRONIZATION CHANNEL)
PBCH (PHYSICAL BROADCAST CHANNEL)
RS (CELL-SPECIFIC REFERENCE SIGNAL) FOR SELECTED TX ANTENNA PORT
PCFICH (PHYSICAL CONTROL FORMAT INDICATOR CHANNEL)
PHICH (PHYSICAL HYBRID ARQ (AUTOMATIC REPEAT REQUEST) INDICATOR CHANNEL)
PDCCH (PHYSICAL DOWNLINK CONTROL CHANNEL)
AVAILABLE FOR PDSCH (PHYSICAL DOWNLINK SHARED CHANNEL)

*FIG. 8B*

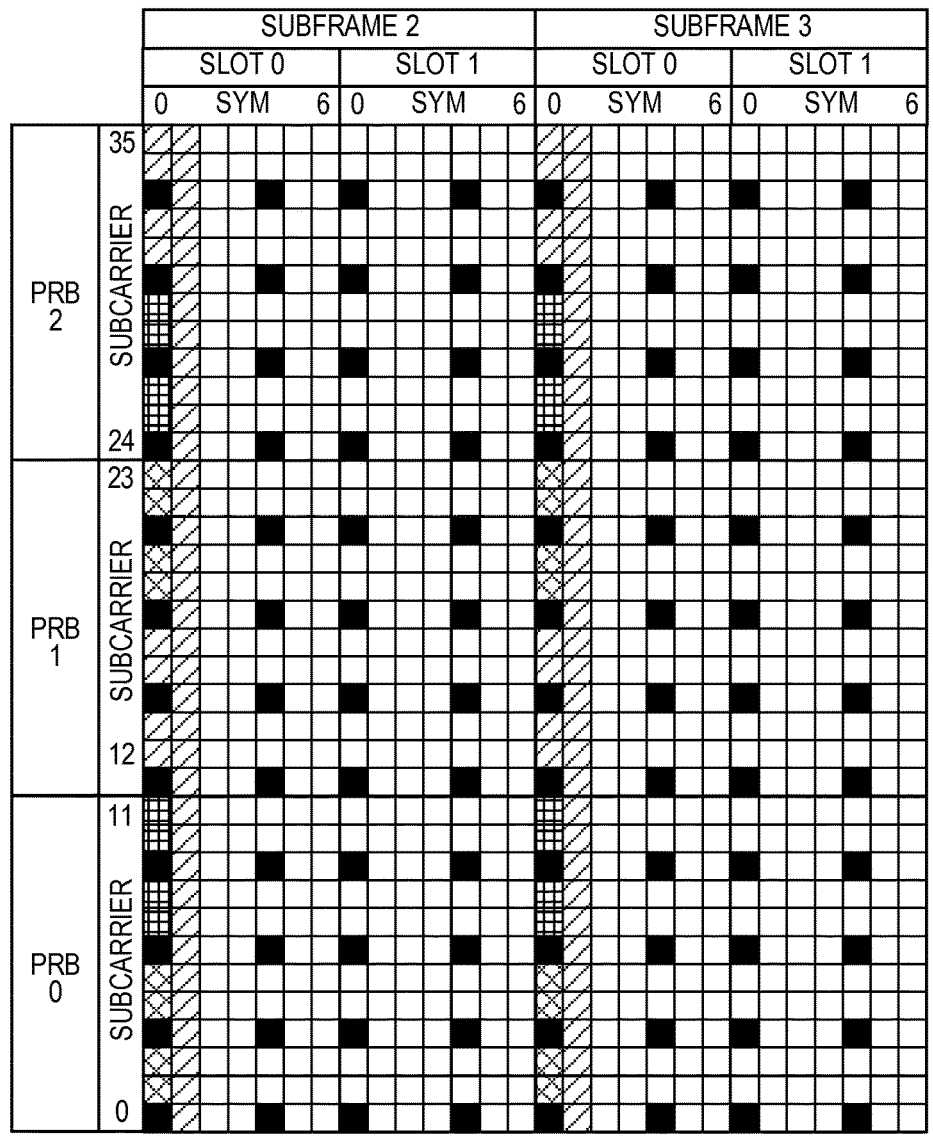

- PSCH (PRIMARY SYNCHRONIZATION CHANNEL)
- SSCH (SECONDARY SYNCHRONIZATION CHANNEL)
- PBCH (PHYSICAL BROADCAST CHANNEL)
- RS (CELL-SPECIFIC REFERENCE SIGNAL) FOR SELECTED TX ANTENNA PORT
- PCFICH (PHYSICAL CONTROL FORMAT INDICATOR CHANNEL)
- PHICH (PHYSICAL HYBRID ARQ (AUTOMATIC REPEAT REQUEST) INDICATOR CHANNEL)
- PDCCH (PHYSICAL DOWNLINK CONTROL CHANNEL)
- AVAILABLE FOR PDSCH (PHYSICAL DOWNLINK SHARED CHANNEL)

*FIG. 8C*

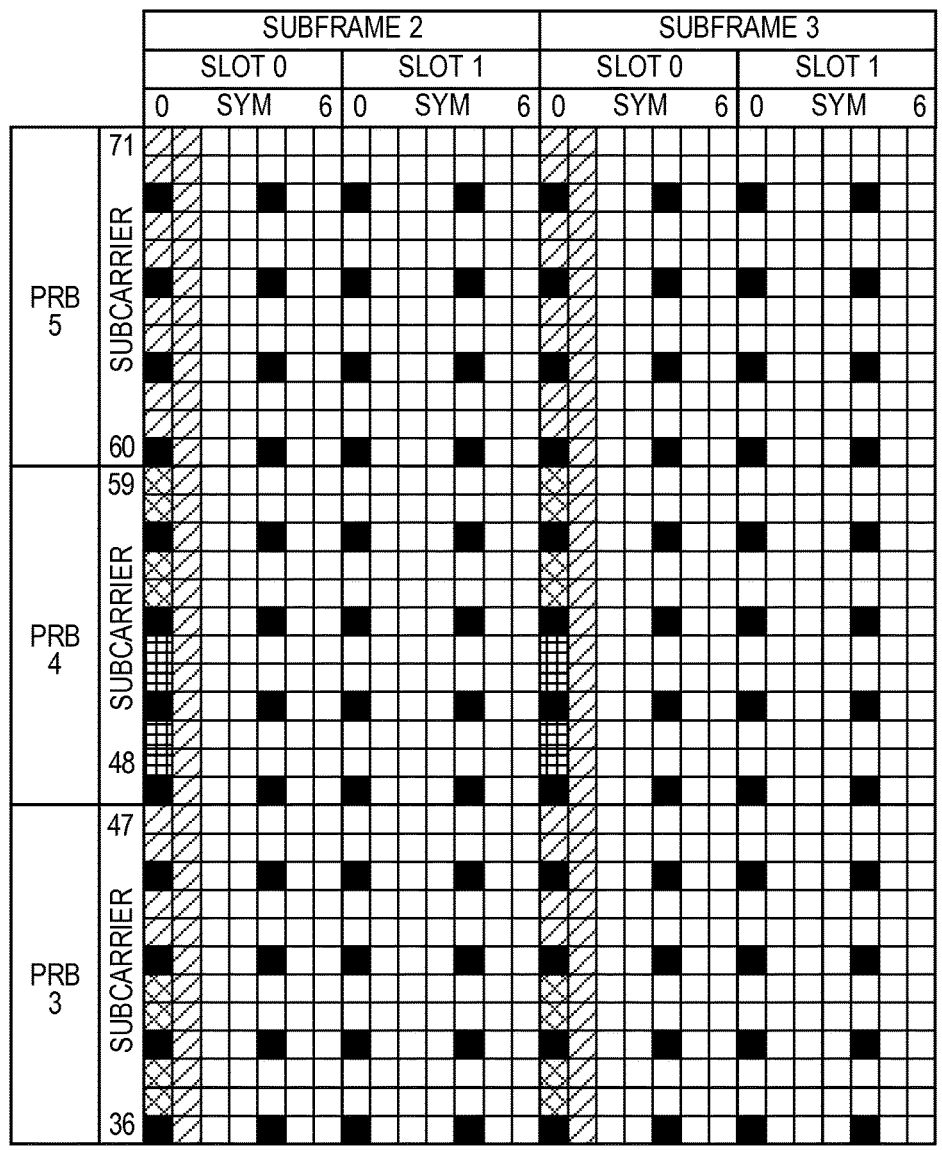

PSCH (PRIMARY SYNCHRONIZATION CHANNEL)
SSCH (SECONDARY SYNCHRONIZATION CHANNEL)
PBCH (PHYSICAL BROADCAST CHANNEL)
RS (CELL-SPECIFIC REFERENCE SIGNAL) FOR SELECTED TX ANTENNA PORT
PCFICH (PHYSICAL CONTROL FORMAT INDICATOR CHANNEL)
PHICH (PHYSICAL HYBRID ARQ (AUTOMATIC REPEAT REQUEST) INDICATOR CHANNEL)
PDCCH (PHYSICAL DOWNLINK CONTROL CHANNEL)
AVAILABLE FOR PDSCH (PHYSICAL DOWNLINK SHARED CHANNEL)

*FIG. 8D*

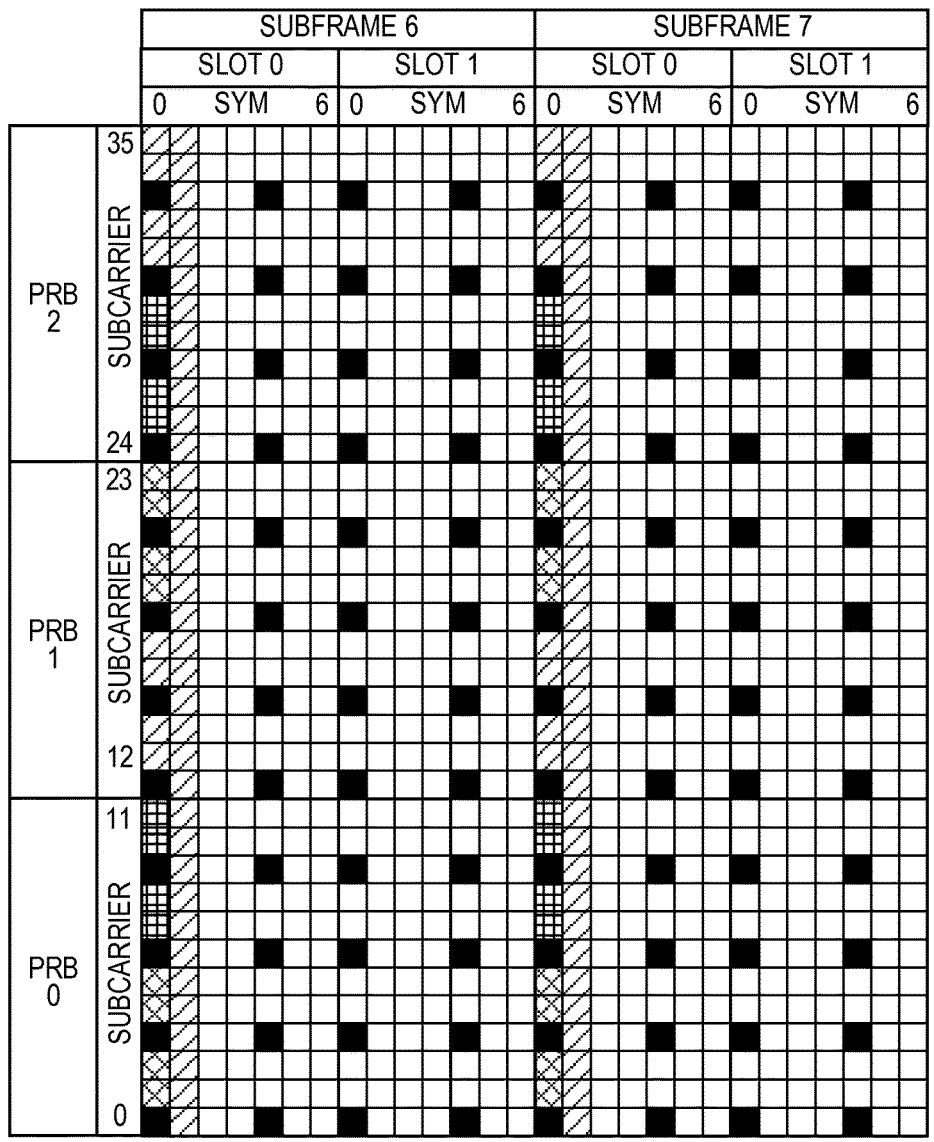

PSCH (PRIMARY SYNCHRONIZATION CHANNEL)
SSCH (SECONDARY SYNCHRONIZATION CHANNEL)
PBCH (PHYSICAL BROADCAST CHANNEL)
RS (CELL-SPECIFIC REFERENCE SIGNAL) FOR SELECTED TX ANTENNA PORT
PCFICH (PHYSICAL CONTROL FORMAT INDICATOR CHANNEL)
PHICH (PHYSICAL HYBRID ARQ (AUTOMATIC REPEAT REQUEST) INDICATOR CHANNEL)
PDCCH (PHYSICAL DOWNLINK CONTROL CHANNEL)
AVAILABLE FOR PDSCH (PHYSICAL DOWNLINK SHARED CHANNEL)

*FIG. 8G*

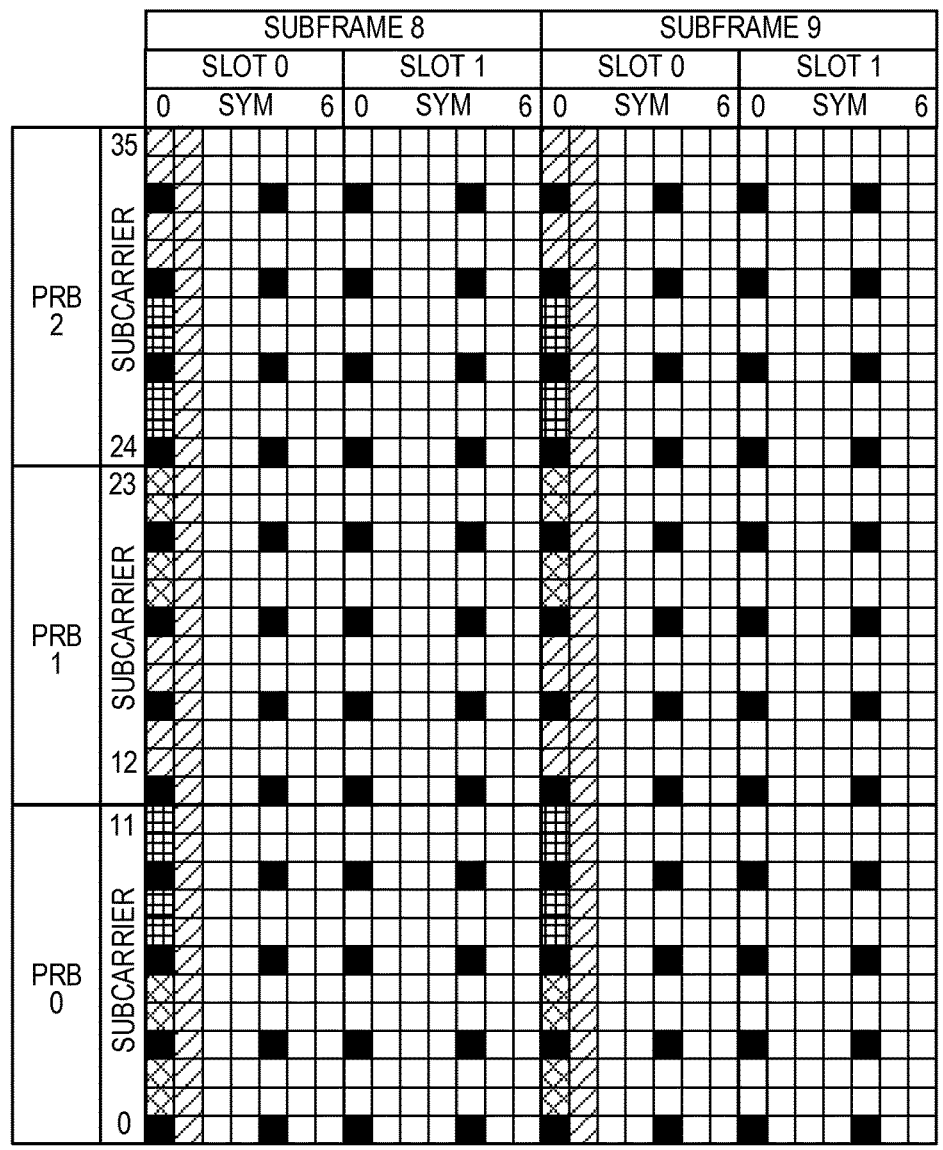

- PSCH (PRIMARY SYNCHRONIZATION CHANNEL)
- SSCH (SECONDARY SYNCHRONIZATION CHANNEL)
- PBCH (PHYSICAL BROADCAST CHANNEL)
- RS (CELL-SPECIFIC REFERENCE SIGNAL) FOR SELECTED TX ANTENNA PORT
- PCFICH (PHYSICAL CONTROL FORMAT INDICATOR CHANNEL)
- PHICH (PHYSICAL HYBRID ARQ (AUTOMATIC REPEAT REQUEST) INDICATOR CHANNEL)
- PDCCH (PHYSICAL DOWNLINK CONTROL CHANNEL)
- AVAILABLE FOR PDSCH (PHYSICAL DOWNLINK SHARED CHANNEL)

*FIG. 8I*

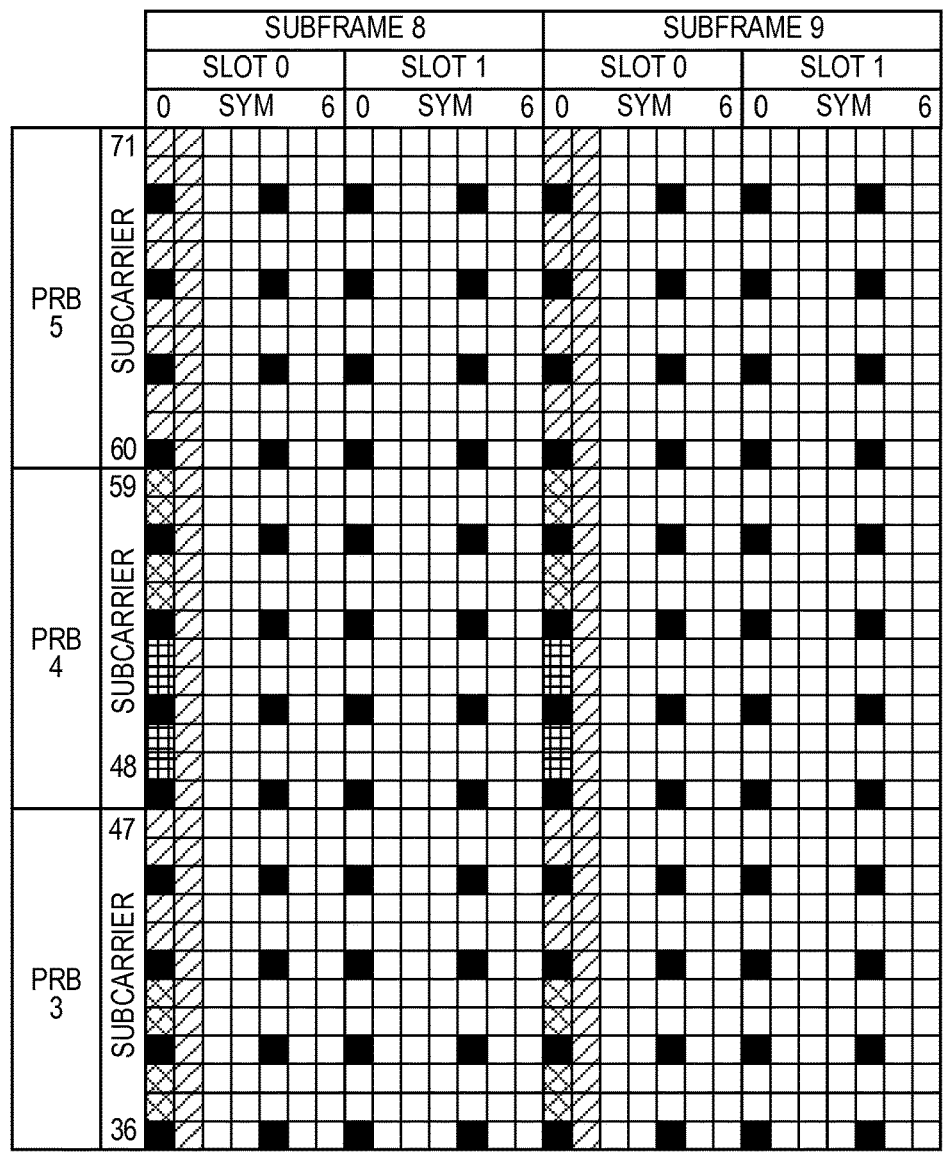

PSCH (PRIMARY SYNCHRONIZATION CHANNEL)
SSCH (SECONDARY SYNCHRONIZATION CHANNEL)
PBCH (PHYSICAL BROADCAST CHANNEL)
RS (CELL-SPECIFIC REFERENCE SIGNAL) FOR SELECTED TX ANTENNA PORT
PCFICH (PHYSICAL CONTROL FORMAT INDICATOR CHANNEL)
PHICH (PHYSICAL HYBRID ARQ (AUTOMATIC REPEAT REQUEST) INDICATOR CHANNEL)
PDCCH (PHYSICAL DOWNLINK CONTROL CHANNEL)
AVAILABLE FOR PDSCH (PHYSICAL DOWNLINK SHARED CHANNEL)

*FIG. 8J*

FILLING EMPTY SYMBOLS IN CELLULAR COMMUNICATIONS NETWORK TRANSMISSIONS IN UNLICENSED SPECTRUM

This application is a 35 U.S.C. § 371 national phase filing of International Application No. PCT/IB2015/051000, filed Feb. 10, 2015, the disclosure of which is incorporated herein by reference in its entirety.

RELATED APPLICATIONS

This application claims the benefit of provisional patent application Ser. No. 62/094,730, filed Dec. 19, 2014, the disclosure of which is hereby incorporated herein by reference in its entirety.

TECHNICAL FIELD

The present disclosure relates to the use of a cellular communications network radio access technology (e.g., Long Term Evolution (LTE)) in an unlicensed, or shared, spectrum.

BACKGROUND

In order to cope with tremendously growing wireless data traffic in recent years, wireless operators and equipment manufacturers have been exploring different options to address high traffic areas with more bandwidth. One attractive option is adapting Long Term Evolution (LTE) to operate in an unlicensed frequency band or spectrum. This option combines the robust operation benefits of LTE with the large amount of bandwidth available in unlicensed spectrum. Furthermore, such an adapted LTE network can be controlled by one core network and thus requires low operational expenses. However, other existing wireless technologies (e.g., WiFi) already operate in unlicensed frequency bands. It is therefore necessary to devise coexistence solutions to ensure fair sharing among LTE and other wireless technologies in an unlicensed frequency band. As such, new LTE standards are being developed to make use of unlicensed shared spectrum. Some of these technologies are termed as LTE Unlicensed (LTE-U), Licensed Access LTE (LA-LTE), or Licensed Assisted Access LTE (LAA-LTE).

There are a number of technical issues that must be addressed in order to deploy LTE in shared unlicensed spectrum. Shared unlicensed spectrum operates very differently compared to traditional licensed 3rd Generation Partnership Program (3GPP) spectrum. Users of unlicensed spectrum must share the spectrum resources with other wireless, or radio, technologies, and do so in a fair way while at the same time ensuring that the spectrum is used as efficiently as possible. In addition, many different wireless technologies may use unlicensed spectrum, e.g., WiFi. By contrast, the LTE protocols and specifications have been developed on the premise that only LTE nodes operate in the same spectrum.

One of the most significant current aspects for LTE-U is the requirement that the LTE-U enhanced, or evolved, Node B (eNB) periodically stops all transmissions in order to allow other technologies to access the radio channel. This ON/OFF transmission is in the order of tens to hundreds of milliseconds (ms) and can be dynamically changed based on radio channel usage.

In light of the discussion above, there is a need for systems and methods that enable coexistence of LTE and one or more other wireless technologies in the same shared unlicensed spectrum.

SUMMARY

The present disclosure provides systems and methods relating to coexistence of a cellular communications network technology (e.g., Long Term Evolution (LTE)) and another wireless technology (e.g., WiFi) in a shared unlicensed spectrum. In particular, the present disclosure provides systems and methods that mitigate or avoid grabbing of an unlicensed, or shared, frequency band utilized by a wireless communications network node by a node of another wireless technology that operates according to a listen-before-talk scheme.

In some embodiments, a method of avoiding carrier grabbing in an unlicensed frequency band utilized by a cellular communications network comprises preparing a signal mapping for a symbol to be transmitted by the cellular communications network in the unlicensed frequency band, determining whether the symbol is an empty symbol, an empty symbol being a symbol that is likely to be considered by a wireless node of another wireless technology that is sharing the unlicensed frequency band as a clear channel. The method further comprises, if the symbol is an empty symbol, filling the symbol with one or more additional signals prior to transmission by the cellular communications network such that the symbol is not an empty symbol. By filling the symbol prior to transmission, carrier grabbing is avoided.

In some embodiments, the method further comprises determining whether the symbol is within a predefined number of symbol periods prior to a protected symbol to be transmitted by the cellular communications network in the unlicensed frequency band, the predefined number of symbol periods being greater than or equal to one. Filling the symbol with one or more additional signals comprises filling the symbol with the one or more additional signals if the symbol is an empty symbol and the symbol is within the predefined number of symbol periods prior to a protected symbol to be transmitted by the cellular communications network in the unlicensed frequency band.

In some embodiments, the predefined number of symbol periods is a function of protected symbol type. In some embodiments, the predefined number of symbol periods is based on past statistics. In some embodiments, the predefined number of symbol periods is based on at least one of a group consisting of: an observed probability of protected symbols and received interference power during protected symbols.

In some embodiments, the predefined number of symbol periods is based on channel load such that the predefined number of symbol periods increases as the channel load increases. In some embodiments, the predefined number of symbol periods is further based on protected symbol type.

In some embodiments, the cellular communications network is a LTE cellular communications network, and the symbol is an Orthogonal Frequency Division Modulation (OFDM) symbol. Further, in some embodiments, the protected symbol is one of a group consisting of: a Primary Synchronization Channel (PSCH) symbol, a Secondary Synchronization Channel (SSCH) symbol, a Physical Control Format Indicator Channel (PCFICH) symbol, and a Physical Downlink Control Channel (PDCCH) symbol. In some embodiments, determining whether the symbol is an empty symbol comprises determining whether the symbol is an empty symbol based on at least one of a group consisting of: a ratio of unused resource elements to total available resource elements in the OFDM symbol and a power of the OFDM symbol.

In some embodiments, the other wireless technology is WiFi.

In some embodiments, the one or more additional signals are one or more additional signals that are not decoded or are not required to be decoded by any wireless device in the cellular communications network.

In some embodiments, the one or more additional signals are one or more additional signals that contain useful data for at least one of a group consisting of: one or more wireless devices in the cellular communications network and one or more wireless nodes operating according to the other wireless technology.

In some embodiments, the method is performed by one or more network nodes of the cellular communications network.

Embodiments of a network node of a cellular communications network that operates to mitigate or avoid grabbing of an unlicensed, or shared, frequency band by a node of another wireless technology are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 8 and 8A through 8J illustrate the existing LTE frame structure including examples of protected symbols according to some embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Before specifically describing embodiments of the present disclosure, a brief description of $3^{rd}$ Generation Partnership Project (3GPP) Long Term Evolution (LTE), Carrier Aggregation (CA), and Licensed Assisted Access (LAA) to unlicensed spectrum using LTE is beneficial. For simplicity, 'uplink' and 'downlink' are sometimes used herein to refer to uplink communication or transmission and downlink communication or transmission, respectively. Notably, while much of the description below focuses on LTE and WiFi, the present disclosure is not limited thereto.

Figure 1:
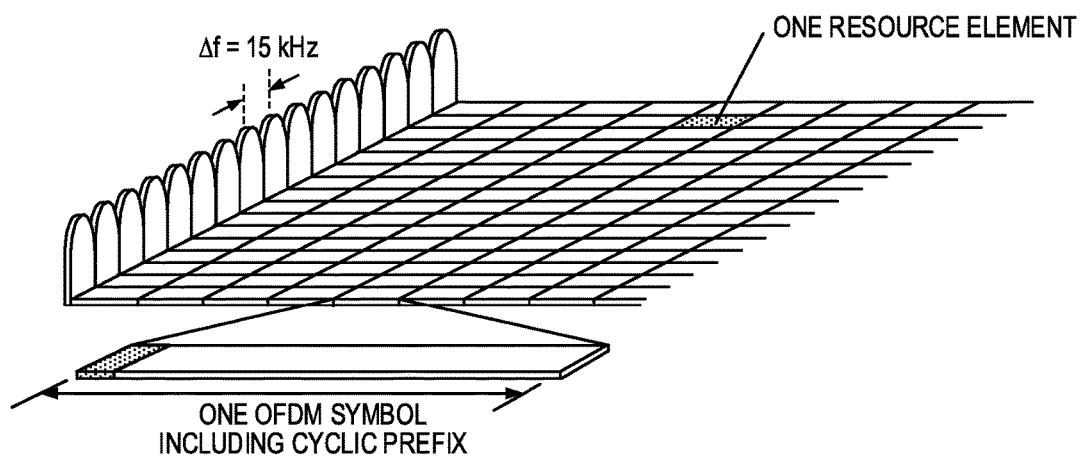
FIG. 1 illustrates the Long Term Evolution (LTE) downlink physical resource.

LTE uses Orthogonal Frequency Division Multiplexing (OFDM) in the downlink and Discrete Fourier Transform (DFT) spread OFDM (also referred to as single-carrier Frequency Division Multiple Access (FDMA)) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink subframe and the same number of Single Carrier FDMA (SC-FDMA) symbols in the time domain as OFDM symbols in the downlink subframe.

Figure 2:
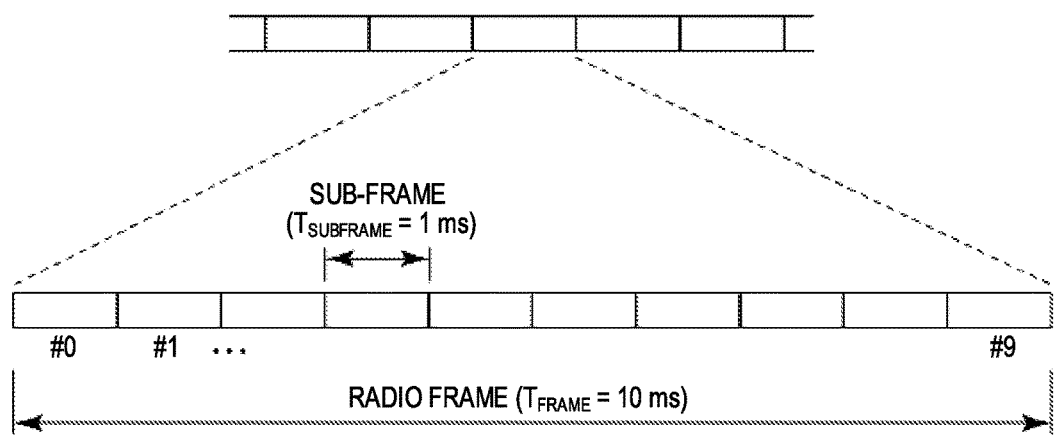
FIG. 2 illustrates the LTE time domain structure.

In the time domain, LTE downlink transmissions are organized into radio frames of 10 milliseconds (ms), each radio frame consisting of ten equally-sized subframes of length $T_{subframe}$=1 ms as shown in FIG. 2. For normal cyclic prefix, one subframe consists of 14 OFDM symbols. The duration of each symbol is approximately 71.4 microseconds (μs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in the time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminal's data is transmitted to and upon which resource blocks the data is transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and used for coherent demodulation of the control information. A downlink system with CFI=3 OFDM symbols as control is illustrated in FIG. 3.

Figure 3:
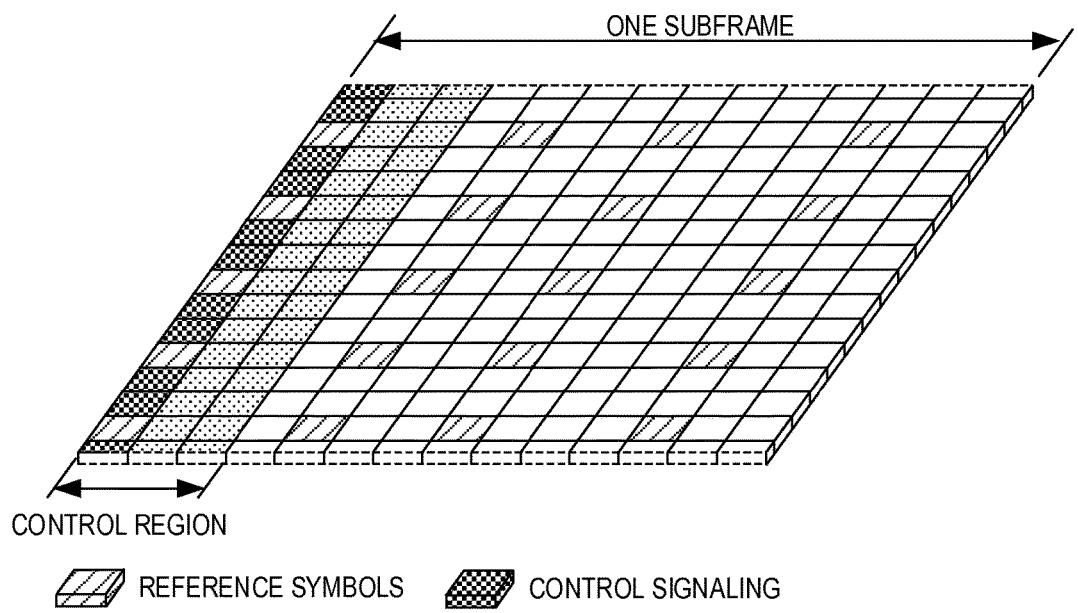
FIG. 3 illustrates a normal downlink subframe.

The reference symbols shown in FIG. 3 are the Cell Specific Reference Symbols (CRS) and are used to support multiple functions including fine time and frequency synchronization and channel estimation for certain transmission modes.

Figure 4:
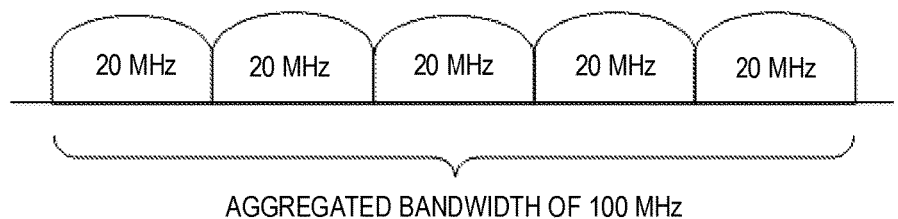
FIG. 4 illustrates Carrier Aggregation (CA)

The LTE Release 10 (LTE Rel-10) standard supports bandwidths larger than 20 Megahertz (MHz). One important requirement on LTE Rel-10 is to assure backward compatibility with LTE Release 8 (LTE Rel-8). This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments, it can be expected that there will be a smaller number of LTE Rel-10-capable terminals compared to many LTE legacy terminals. Therefore, it is necessary to assure an efficient use of a wide carrier also for legacy terminals, i.e., it is possible to implement carriers where legacy terminals can be scheduled in all parts of the wideband LTE Rel-10 carrier. The straightforward way to obtain this would be by means of CA. CA implies that an LTE Rel-10 terminal can receive multiple CCs, where CCs have, or at least the possibility to have, the same structure as a LTE Rel-8 carrier. CA is illustrated in FIG. 4. A CA-capable User Equipment (UE) is assigned a Primary Cell (PCell), which is always activated, and one or more Secondary Cells (SCells), which can be activated or deactivated dynamically.

The number of aggregated CCs as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell can be different from the number of CCs seen by a terminal. A terminal can for example support more downlink CCs than uplink CCs, even though the cell is configured with the same number of uplink and downlink CCs.

A UE is first connected to the LTE system via the PCell. The network can then configure the UE to aggregate additional SCell(s). The SCell configuration for activation and deactivation is carried out via Radio Resource Control (RRC) signaling, which typically takes tens of ms.

A configured SCell can be further put into one of two states: activated or deactivated. For an activated SCell, the UE will need to monitor the SCell in order to maintain time/frequency synchronization, monitor control channels, and report Channel Quality Information/Channel State Information (CQI/CSI) back to the network. For a deactivated SCell, the UE will not need to monitor the SCell. The activation and deactivation commands are sent by Medium Access Control (MAC) elements and the UE can apply these commands quickly.

Up to now, the spectrum used by LTE is dedicated to LTE. This has the advantage that the LTE system does not need to care about the coexistence issue and thus spectrum efficiency can be maximized. However, unlicensed spectrum can, by definition, be simultaneously used/shared by multiple different technologies. To operate in the unlicensed band, LTE needs to consider the coexistence issue with other systems such as IEEE 802.11 (i.e., WiFi).

Figure 5:
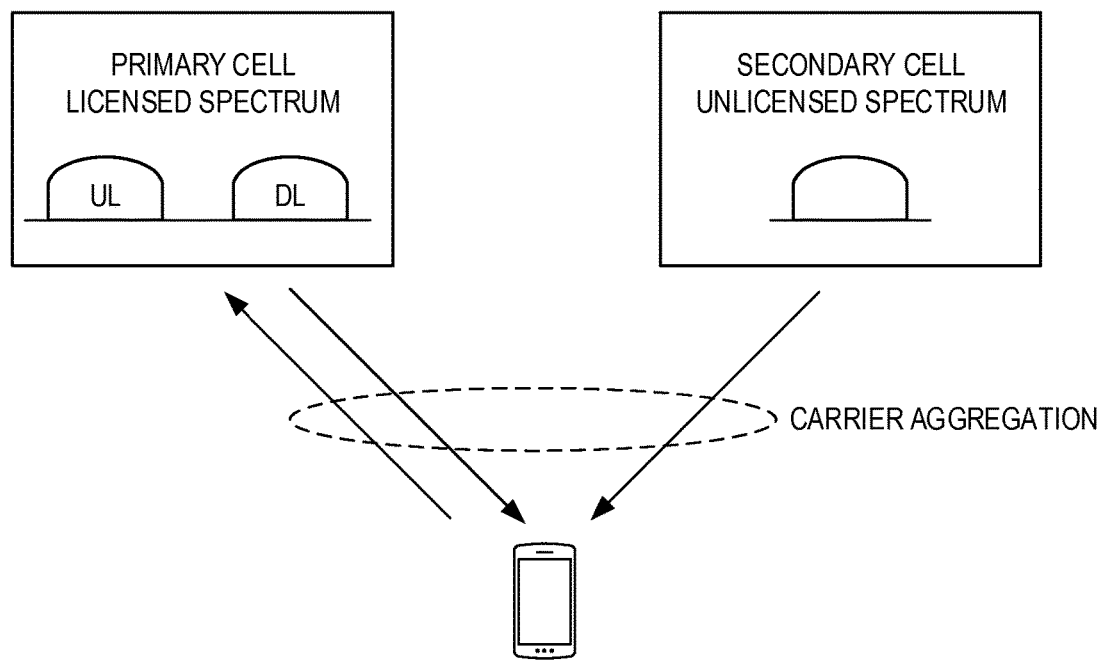
FIG. 5 illustrates Licensed Assisted Access (LAA) to unlicensed spectrum using LTE CA.

In the LAA to unlicensed spectrum using LTE framework, as shown in FIG. 5, a UE is connected to a PCell in the licensed band and one or more SCells in the unlicensed band. In this disclosure, a SCell in unlicensed spectrum is denoted as an LAA SCell. Under this LAA framework, the PCell retains the mobility and high-layer control while the SCell is geared towards serving the best effort user data. The PCell is supposed to also serve users when the unlicensed SCell is unavailable.

The existing LTE specification requires that LTE operates in well regulated spectrum. Currently, LTE is not designed to share the same radio spectrum resources with non-LTE radio technologies. LTE uses a fixed radio frame format built in time using ~71 μs symbols, arranged into time slots which are grouped into subframes. Ten (10) subframes complete a 10 ms LTE radio frame. LTE is not required to use all the symbols across the used frequencies in each time slot, i.e., there will be many empty symbols during an LTE frame transmission.

WiFi by contrast is designed to share radio spectrum. As such, WiFi has been developed to take advantage of any transmission silent periods. WiFi performs carrier sensing to determine if the radio carrier is free or in use. If a WiFi node does not detect any transmission for 20 μs it concludes that the radio carrier is free and can start transmitting. This is referred to as "listen-before-talk." As such, an empty LTE symbol (~71 μs) is long enough for a WiFi node to start transmitting. In other words, the WiFi node may grab the radio carrier or channel during the empty LTE symbol. If this was to happen in the middle of an LTE frame transmission, it will interfere with used symbols in the frame and both the LTE and WiFi transmission will be negatively impacted.

Figure 6:
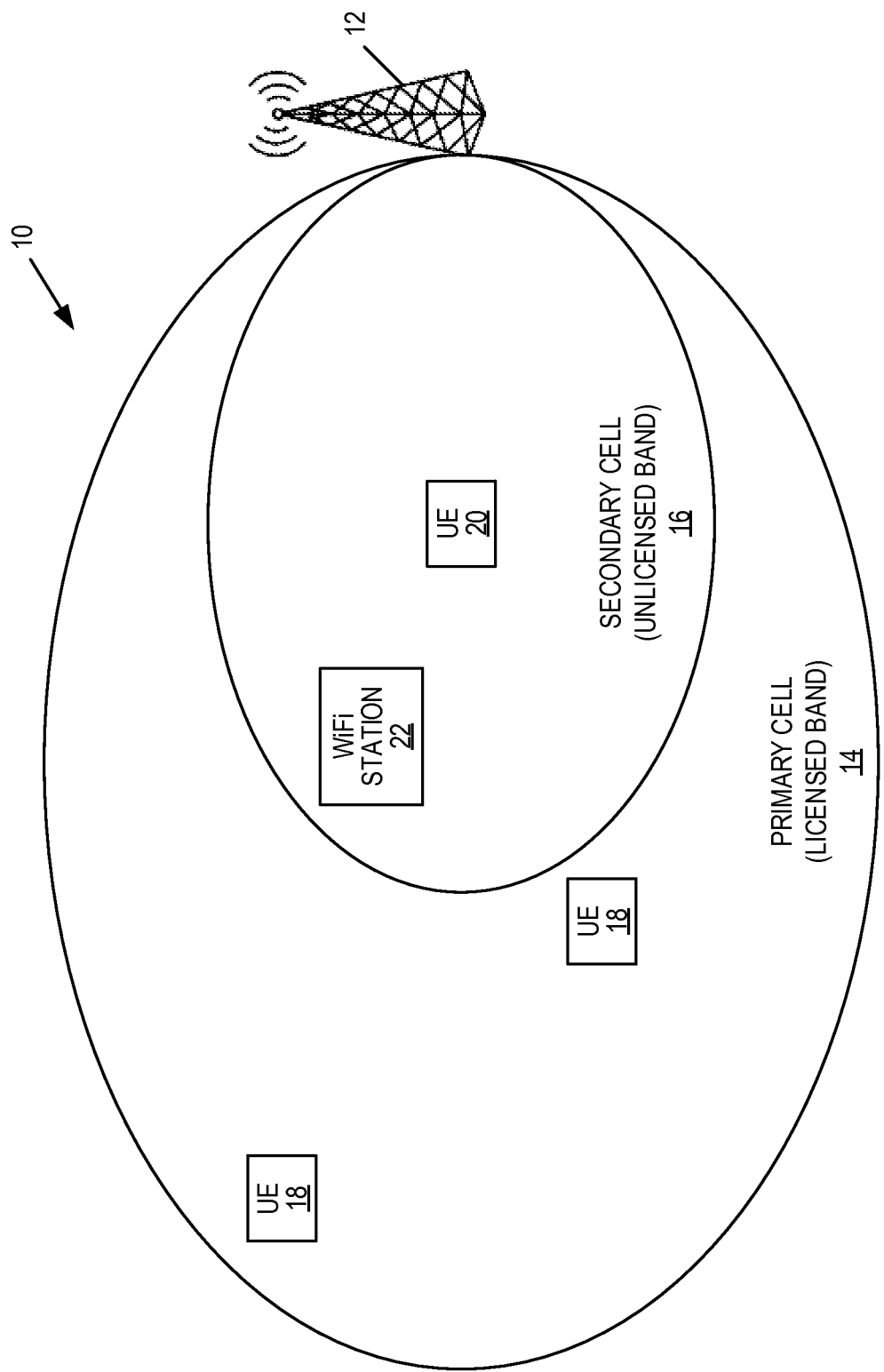
FIG. 6 illustrates one example of an LTE network using an unlicensed frequency band according to some embodiments of the present disclosure.

Systems and methods are disclosed herein that prevent grabbing of a wireless, or radio, channel utilized for transmission from a wireless node (e.g., an LTE eNB) of a cellular communications technology (e.g., LTE) in an unlicensed, or shared, frequency band by a wireless node (e.g., WiFi station) of another wireless technology (e.g., WiFi). In this regard, FIG. 6 illustrates a cellular communications network 10 that utilizes an unlicensed frequency band according to some embodiments of the present disclosure. For much of the description below, the cellular communications network 10 is a 3GPP LTE network and, as such, the cellular communications network 10 is also referred to herein as a LTE network 10 and 3GPP terminology is sometimes used. The LTE network 10 may be either a Time Division Duplexing (TDD) or a Frequency Division Duplexing (FDD) network. Note, however, that the present disclosure is not limited to LTE. Rather, the concepts disclosed herein may be utilized with any suitable type of cellular communications network that desires to operate in an unlicensed, or shared, frequency band/spectrum.

The LTE network 10 includes an LTE node 12, which in the illustrated example is an eNB. However, the LTE node 12 may be any radio access node or any core network node in the LTE network 10 that controls particularly a SCell 16. In this example, the LTE network 10 operates according to a CA scheme, and the LTE node 12 controls both a PCell 14 and a SCell 16. The PCell 14 operates in a licensed frequency band in the conventional manner. However, the SCell 16 operates in an unlicensed, or shared, frequency band. A number of UEs 18 are connected to the PCell 14, while another UE 20 is connected to both the PCell 14 and the SCell 16 according to a CA scheme. Note that FIG. 6 is only an example. For instance, in another embodiment, the SCell 16 may be provided via a Remote Radio Head (RRH) controlled by the LTE node 12.

In order to enable co-existence of the SCell 16 and, in this example, WiFi provided by a WiFi station 22 on the unlicensed, or shared, frequency band, the LTE node 12 controlling the SCell 16 operates to transmit on the SCell 16 according to a Discontinuous Transmission (DTX) scheme where the SCell 16 is sometimes on and sometimes off. In order to, for example, prevent WiFi grabbing of the spectrum used by the SCell 16 mid-frame, the LTE node 12 operates to fill at least some empty OFDM symbols in the SCell 16 with additional data, which is sometime referred to herein as dummy data. In some embodiments, the LTE node 12 only fills empty OFDM symbols that are X OFDM symbol times before a protected OFDM symbol (e.g., a Primary Synchronization Channel (PSCH), Secondary Synchronization Channel (SSCH), Physical Control Format Indicator Channel (PCFICH), or Physical Downlink Control Channel (PDCCH) symbol).

Figure 7:
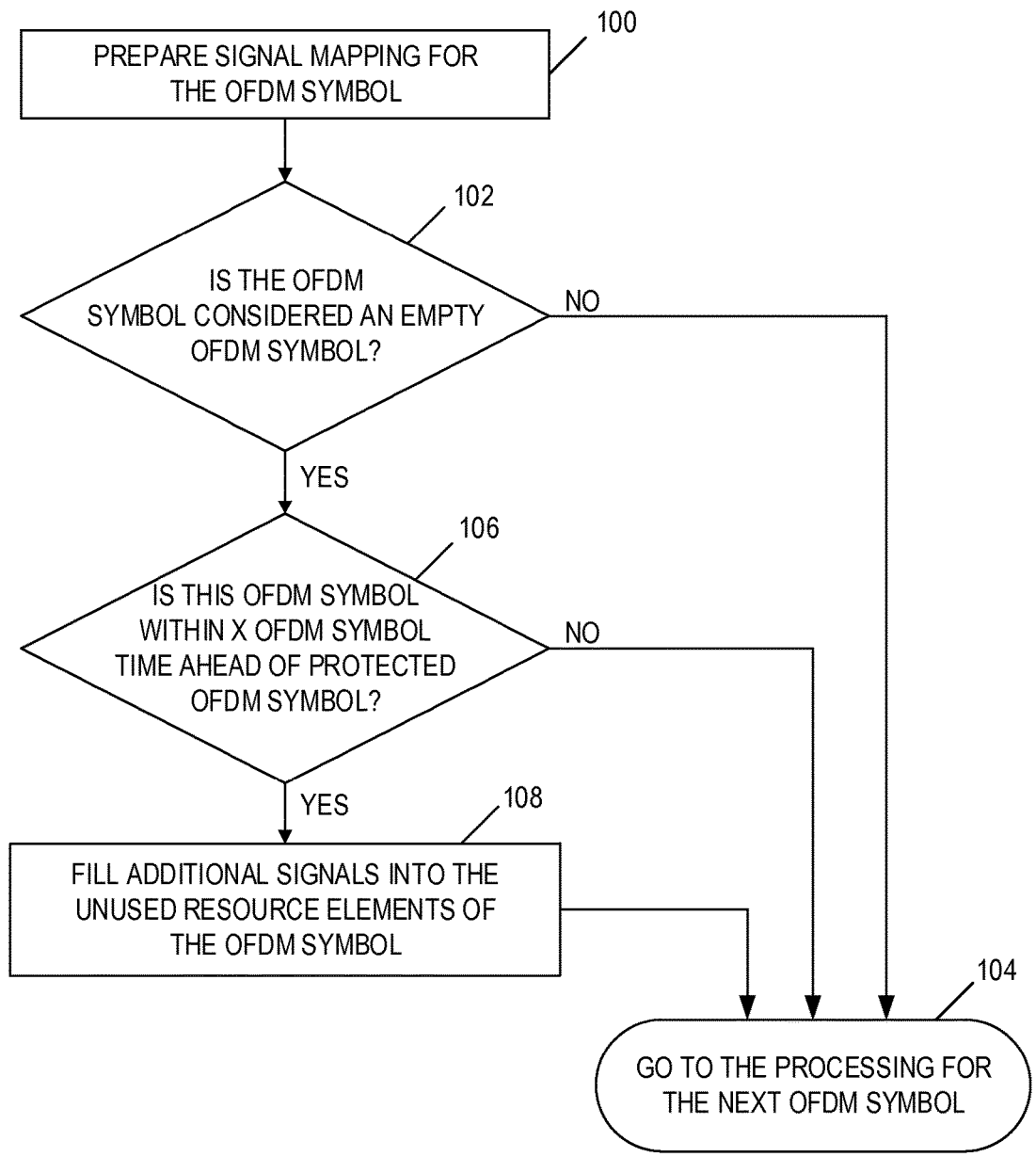
FIG. 7 illustrates a flow chart of a process for detecting and selectively filling empty symbols in order to avoid grabbing of the carrier or radio channel in the unlicensed frequency band by another wireless technology according to some embodiments of the present disclosure.
Figure 8A:
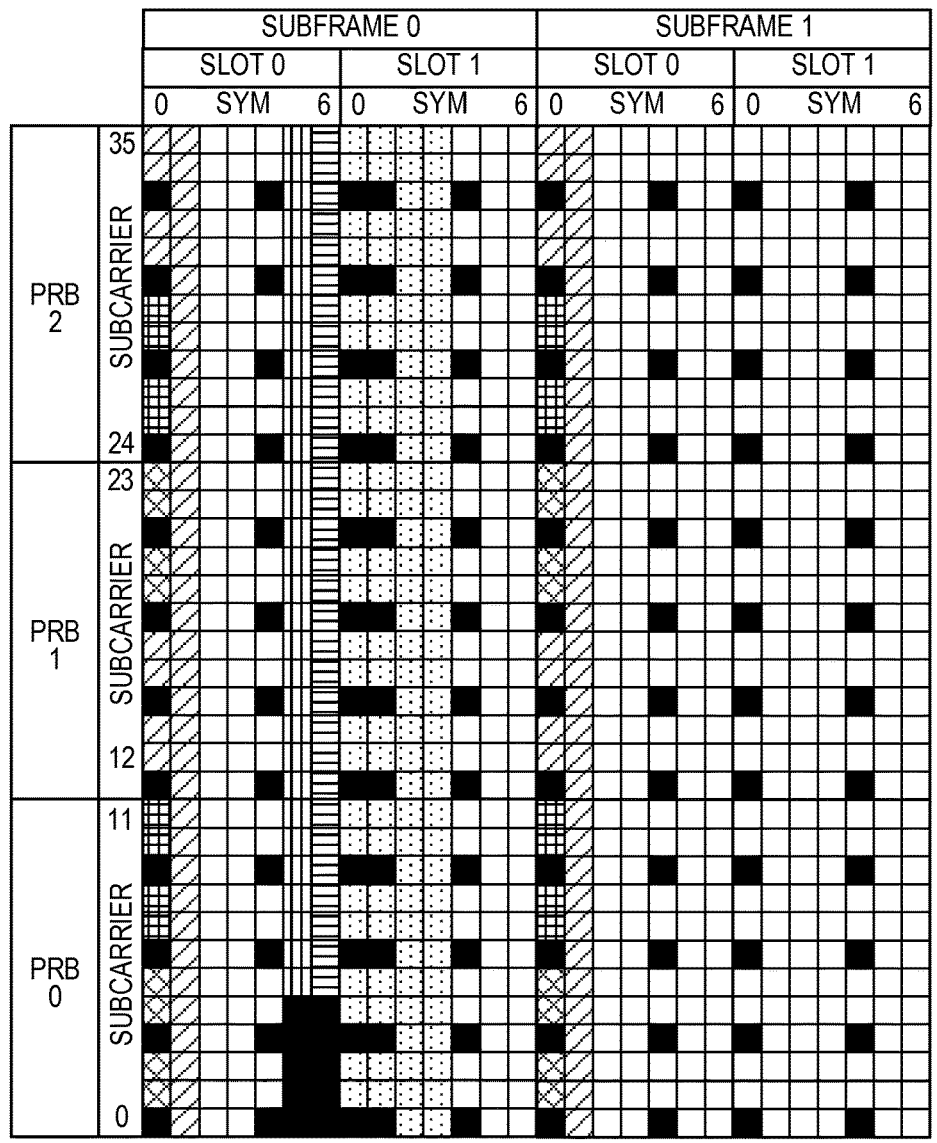
Figure 8E:
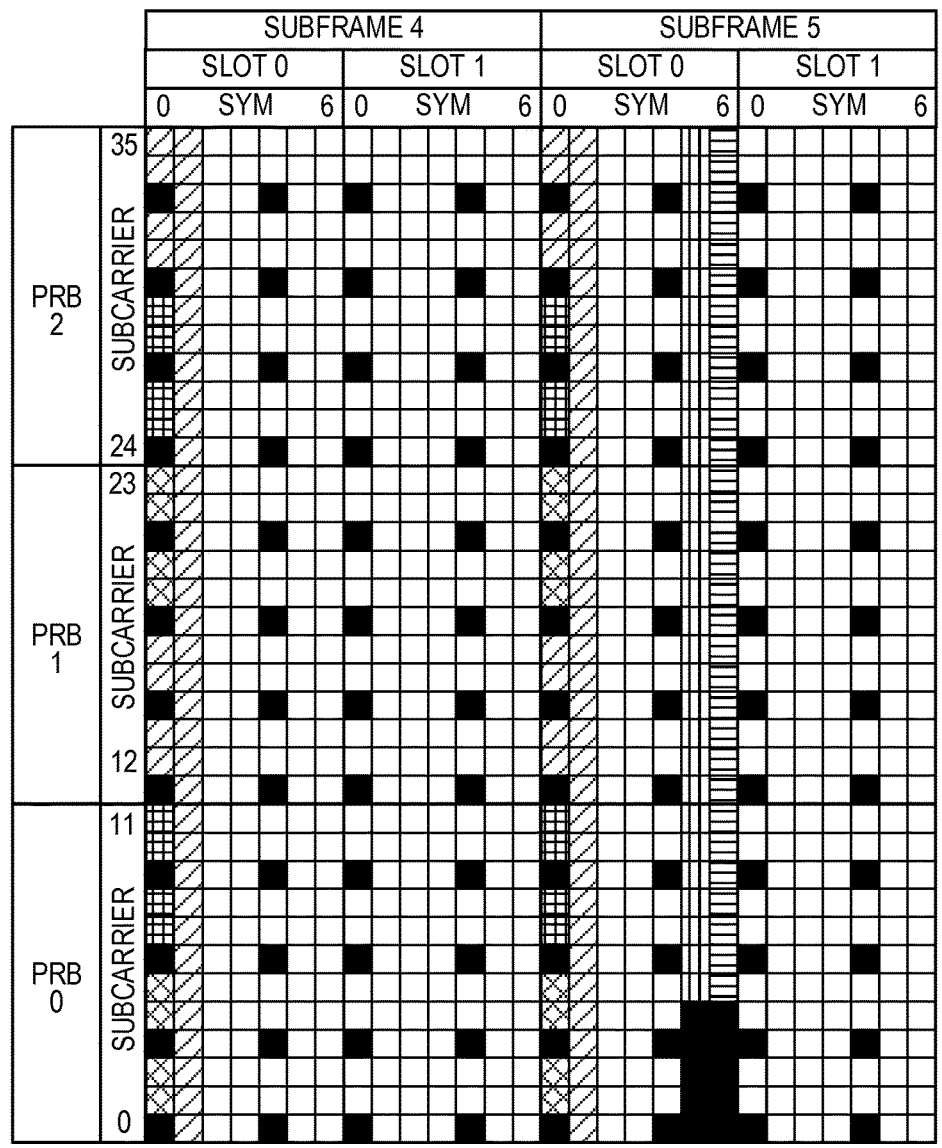
Figure 8F:
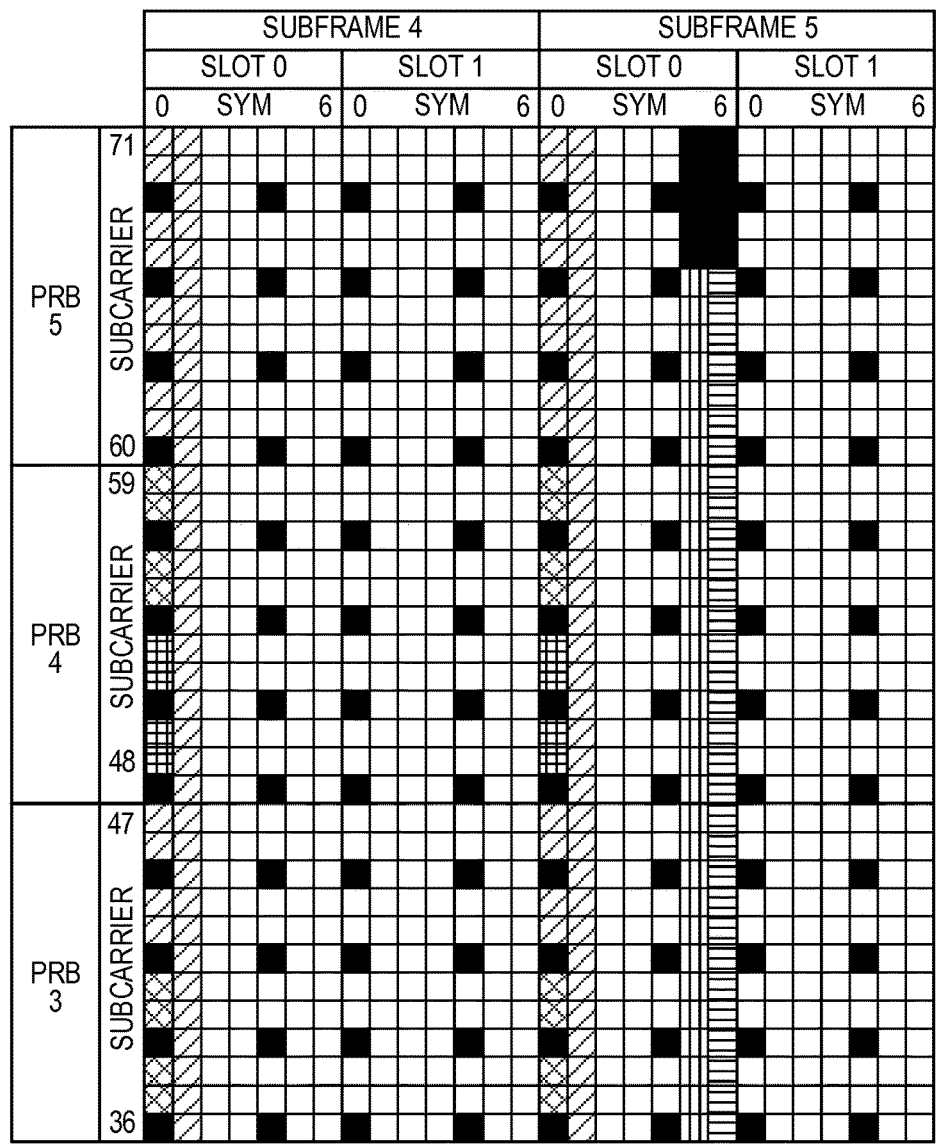
Figure 8H:
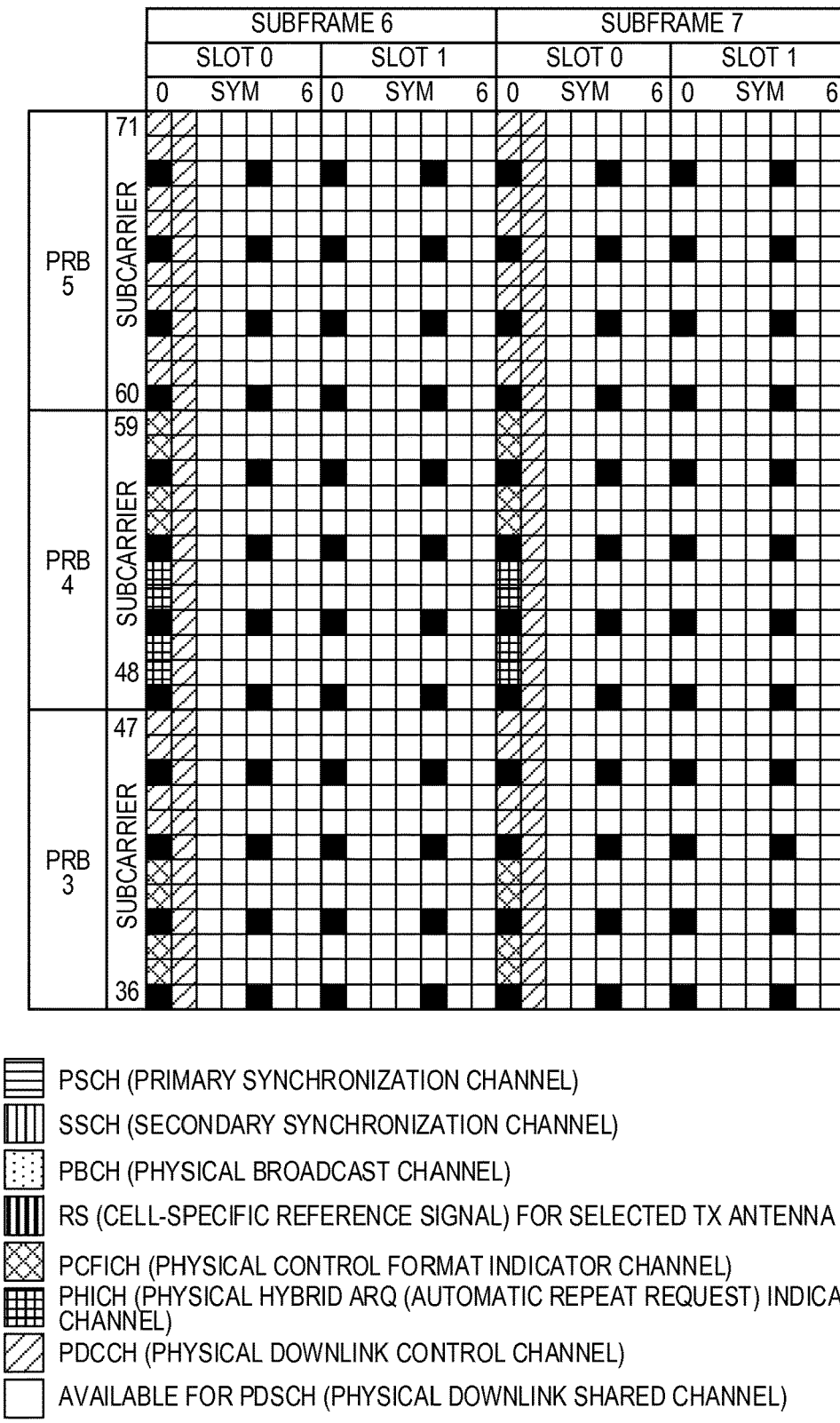

More specifically, FIG. 7 is a flow chart that illustrates the operation of the LTE node 12 according to some embodiments of the present disclosure. In this example, the process is performed by the LTE node 12. Note, however, that in other embodiments the process may be performed by more than one LTE node (e.g., different steps or functions may be distributed across two or more LTE nodes).

As illustrated, normal or conventional signal mapping is performed in order to map data to be transmitted in the SCell 16 to an OFDM symbol (step 100). Next, a determination is made as to whether the OFDM symbol is an empty OFDM symbol (step 102). As used herein, an empty symbol is a symbol that is likely to be considered by the node of the other wireless technology sharing the unlicensed frequency band, or spectrum, as an unused or clear channel. In other words, an empty symbol is a symbol that has sufficiently low energy/power that the symbol is not detected by the receiver of the node of the other wireless technology sharing the unlicensed frequency band, or spectrum. In particular, for WiFi, an empty symbol is a symbol that is likely to be considered by WiFi stations (e.g., the WiFi station 22) as having a received energy below the Clear Channel Assessment (CCA) level. Other listen-before-talk wireless technologies have similar energy thresholds used to detect clear channels or radio carriers. In other words, as used herein, an "empty" OFDM symbol need not have all resource elements be empty. Rather, an "empty" OFDM symbol is an OFDM symbol that is likely to be perceived by a WiFi station (e.g., the WiFi station 22) as being empty (i.e., an OFDM symbol that is likely to result in a WiFi station determining that the carrier is clear). In some embodiments, the LTE node 12 calculates whether the OFDM symbol is an empty OFDM symbol based on at least a ratio of unused resource elements to the total available resource elements, e.g., as compared to an average ratio of used resource elements to total available resource elements and/or a power of the OFDM symbol, e.g., as compared to an average power of other OFDM symbols (e.g., other OFDM symbols transmitted on the SCell 16). Thus, for example, if the ratio of unused resource elements to the total available resource elements is greater than the average ratio of unused resource elements to total available resource elements, e.g., by more than a predefined threshold amount (e.g., 50%), then the OFDM symbol is determined to be an empty symbol. As another example, if the power of the OFDM symbol is less than the average power of other OFDM symbols, e.g., by more than a predefined threshold amount (e.g., 50%), then the OFDM symbol is determined to be an empty symbol.

If the OFDM symbol is not considered as an empty OFDM symbol, no modification to the OFDM symbol is needed. As such, the LTE node 12 proceeds to processing of the next OFDM symbol (step 104). However, if the OFDM symbol is considered as an empty OFDM symbol, the LTE node 12 further evaluates whether the present OFDM symbol is X OFDM symbol times ahead of a protected OFDM symbol(s) (step 106). In some embodiments, the parameter X is 1. In other embodiments, the parameter X is a positive integer greater than or equal to 1. In other embodiments, the parameter X is a positive integer greater than or equal to 1, where the value of X is a function of one or more criteria (e.g., protected symbol type, channel or cell loading, or the like, or any combination thereof). For LTE, the protected OFDM symbol(s) may be, for example, a PSCH symbol, a SSCH symbol, a PCFICH symbol, and/or a PDCCH symbol.

In some embodiments, the parameter X is selected by the LTE node 12 to provide different levels of protection to the protected OFDM symbols. In other words, the parameter X may be a function of one or more factors such as, for example, type of protected OFDM symbol (e.g., a PSCH or SSCH symbol may be provided more protection than other types of protected symbols by having a larger value for the parameter X). With a large X, it is less likely for WiFi stations (e.g., the WiFi station 22) sharing the unlicensed frequency band to transmit and interfere with the protected OFDM symbols.

In some embodiments, the parameter X is adapted by the LTE node 12 based on past statistics of behavior of WiFi stations (e.g., the WiFi station 22) sharing the unlicensed frequency band. For example, using past statistics, the LTE node 12 can increase or decrease X based on at least an observed probability of the protected OFDM symbols and a received interference power during the protected OFDM symbols. This received interference may be interference received by the UE 20, which is measured by the UE 20 and reported to the LTE node 12, and/or interference received and measured by the LTE node 12.

If the empty OFDM symbol is not within X OFDM symbol times ahead of a protected OFDM symbol(s), no modification to the OFDM symbol is needed. As such, processing proceeds to the next OFDM symbol (step 104). However, if the empty OFDM symbol is within X OFDM symbol times ahead of a protected OFDM symbol(s), the LTE node 12 fills the empty OFDM symbol with one or more additional signals such that the empty OFDM symbol is no longer considered an empty OFDM symbol (step 108). In particular, the additional signal(s) are filled into unused resource elements in the OFDM symbol. These additional signals are referred to as signals carrying dummy data. This dummy data may not be decoded by the UE 20. However, in some embodiments, the dummy data may be set in order to aid the UE 20 to measure or synchronize to the radio frame, or may be used in order to provide additional information to the WiFi station 22, e.g. a WiFi or WiFi-like preamble. For example, the UE 20 or the WiFi station 22 is not required to decode the contents of the filled symbol, but the UE 20 or the WiFi station 22 may do so in order to receive additional information regarding the radio channel. After the modification, the processing can proceed to the next OFDM symbol (step 104). While not illustrated, whether the OFDM symbol is filled or not, the OFDM symbol is transmitted by the LTE node 12 on the SCell 16, e.g., in the conventional manner.

Notably, in the process of FIG. 7 all OFDM symbols are processed. However, the present disclosure is not limited thereto. For instance, the LTE node 12 may only process OFDM symbols that it knows are within X OFDM symbol times from a protected OFDM symbol. As one particular example, the order of steps 102 and 106 of FIG. 7 may be reversed such that the LTE node 12 first determines whether the OFDM symbol is within X OFDM symbol times from a protected OFDM symbol before determining whether the OFDM symbol is empty.

Furthermore, with respect to the process of FIG. 7, several steps are indicated above as performed by the LTE node 12. However, processing modules performing these steps do not have to be co-located at the same physical or geographical location. Alternatively, some or all of these steps may be performed by processing modules belonging to different physical entities assisting the LTE network 10, either as part of the LTE node 12 or external to the LTE node 12. Lastly, while the steps of FIG. 7 are illustrated as being performed sequentially in a particular order, the present disclosure is not limited thereto. The steps may be performed in any suitable order and some steps may be performed in parallel.

FIGS. 8 and 8A through 8J illustrate the existing LTE frame structure. In particular, the x-axis is time (radio frame divided into subframes, subframes divided into slots, and slots divided into OFDM symbol periods), and the y-axis is frequency (Physical Resource Blocks (PRBs), each including 12 subcarriers). As shown in FIG. 8, the LTE frame includes CRSs for, in this example, two antenna ports, control regions that can carry downlink control channels, downlink control channels within the control region, and Primary Synchronization Channels and the Secondary Synchronization Channels (PSS/SSS). Note that the black squares in FIGS. 8A through 8J are also CRSs.

As discussed above, in some embodiments, PSCH symbols, SSCH symbols, PCFICH symbols, and/or PDCCH symbols are protected symbols. As such, any empty OFDM symbols that are with X OFDM symbol times prior to these protected symbols are filled with additional signals or data such that these empty signals are not detected by the WiFi station 22 as a clear channel. In this manner, grabbing of the channel or carrier by the WiFi station 22 during transmission of a radio frame on the SCell 16 is avoided.

As discussed above, in some embodiments of the present disclosure, in order to avoid WiFi "grabbing" the radio channel mid-frame, the LTE node 12 (e.g., LTE eNB) fills at least some empty symbols with some value(s) before transmitting them. These symbols may or may not be decoded by the LTE UE 20. The primary goal of these filled symbols, in the context of avoiding WiFi grabbing the radio channel, is to prevent WiFi sensing the carrier as free. However, in some embodiments, the contents of these filled symbols may be set in order to aid the UE 20 to measure or synchronize to the radio frame, or may be used in order to provide additional information to the WiFi station(s), e.g. a WiFi or WiFi-like preamble. For example, in some embodiments, the UE 20 or the WiFi station 22 is not required to decode the contents of the filled symbols, but it may do so in order to receive additional information regarding the radio channel.

Not all empty symbols in all time slots may be filled. In some embodiments, rather than filling all empty symbols, the empty symbols may be selectively filled in order to protect important symbols. For example, in some embodiments, the most important symbols to protect are those in the timeslots immediately after the LTE node 12 (e.g., LTE Unlicensed (LTE-U) eNB) starts transmitting in the shared spectrum. This will help the UE 20 properly decode the LTE frame more quickly and with higher reliability. These timeslots include synchronization and cell reference symbols that are needed by the UE in order to synchronize to the radio carrier and decode the rest of the LTE radio frames.

The primary and secondary synchronization reference symbols are also included in subframe 5. In some embodiments, empty symbols in the same timeslot as the primary and secondary synchronization reference symbols are also filled (e.g., with "dummy" data) so that the primary and secondary synchronization reference symbols are protected. It is left up to implementation what empty symbols are filled.

Filling unused symbols will prevent a WiFi station (e.g., the WiFi station 22) from transmitting in the middle of a LTE-U radio frame. This will speed up the UE 20 to obtain radio synchronization and successfully demodulate the control and user data, thus making more efficient use of the spectrum. By selectively filling empty symbols (instead of all empty symbols), the overall energy level of the transmitting LTE eNB is reduced, thereby reducing interference to neighbor eNBs transmissions. It also leaves some empty symbols which will provide WiFi stations (e.g., the WiFi station 22) with an opportunity to use the channel without impacting the LTE transmission.

Using the embodiments disclosed herein, the existing LTE frame and sub-frame structure is maintained while providing LTE symbol protection, i.e. at the symbol level and without implicit coordination with WiFi. In addition, in some embodiments, the following features are provided:

Protecting some LTE symbols more than others (e.g., control symbols). A protection "probability" algorithm may be applied based on the symbols being protected as well as other factors (e.g., based on channel load—e.g., add more protecting symbols to higher importance LTE symbols as the measured channel load increases). This protection probability algorithm may be used to control X (i.e., the number of OFDM symbol times protected prior to a protected OFDM symbol).

The protection symbols can contain useful information, or useful data, to appropriately modified UEs, i.e. they may not just be filled with random noise, but with some useful code word.

Notably, channel load refers to the amount of the radio frequency channel that is being used in total, e.g., the amount of time that all of the transmitting devices that are sharing the channel transmitting versus the amount of the time that no device is transmitting on the radio frequency channel. Also, as used herein, "useful data" or "useful information" refers to data, or information, that is useful to the UE and/or the WiFi station (i.e., information or data that can be differentiated from random noise by the UE and/or WiFi station).

Embodiments of the present disclosure are particularly applicable to FDD and TDD downlink LTE.

Figure 9:
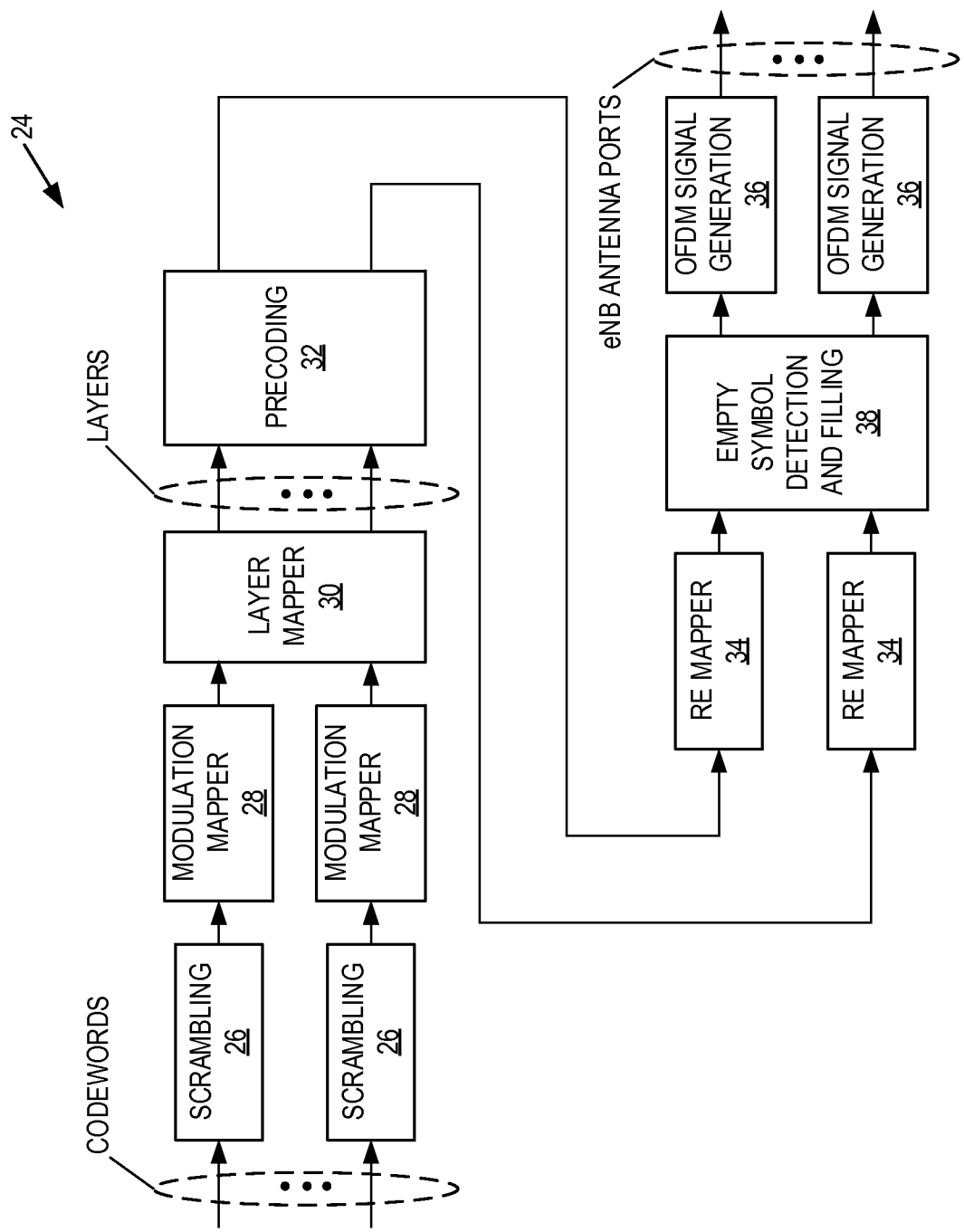
FIG. 9 illustrates one example of a downlink generation system of a LTE enhanced, or evolved, Node B (eNB) that includes an empty symbol detection and filling function or module according to some embodiments of the present disclosure.

As discussed above, in some embodiments, the functionality described herein is implemented in the LTE node 12 and, in particular, in the LTE eNB. FIG. 9 illustrates one example of a downlink signal generation system 24 of an LTE eNB that provides empty symbol detection and filling according to some embodiments of the present disclosure. As illustrated, the downlink signal generation system 24 includes scrambling functions 26, modulation mappers 28, a layer mapper 30, a precoding function 32, Resource Element (RE) mappers 34, and OFDM signal generation functions 36 in the conventional manner. Since these components are all conventional components, their functionality is well-known and, as such, is not repeated herein. In addition to these conventional components, the downlink signal generation system 24 includes an empty symbol detection and filling function 38. Each of the components 26-38 of the downlink signal generation system 24 may be implemented as hardware or a combination of hardware and software (e.g., one or more processors executing software). In essence, the scrambling functions 26, the modulation mappers 28, the layer mapper 30, the precoding function 32, and the RE mappers 34 operate to perform OFDM symbol mapping as described above with respect to step 100 of FIG. 7. The empty symbol detection and filling function 38 operates to detect empty OFDM symbols and (selectively) fill the OFDM symbols as described herein (e.g., as described with respect to steps 102-108 of FIG. 7).

Note that the implementation of FIG. 9 is only one example. In some alternative embodiments, a scheduler of the LTE node 12 (e.g., the eNB scheduler) detects and (selectively) fills empty OFDM symbols for the SCell 16 before sending the data to be transmitted to layer 1 (i.e., the PHY layer).

Figure 10:
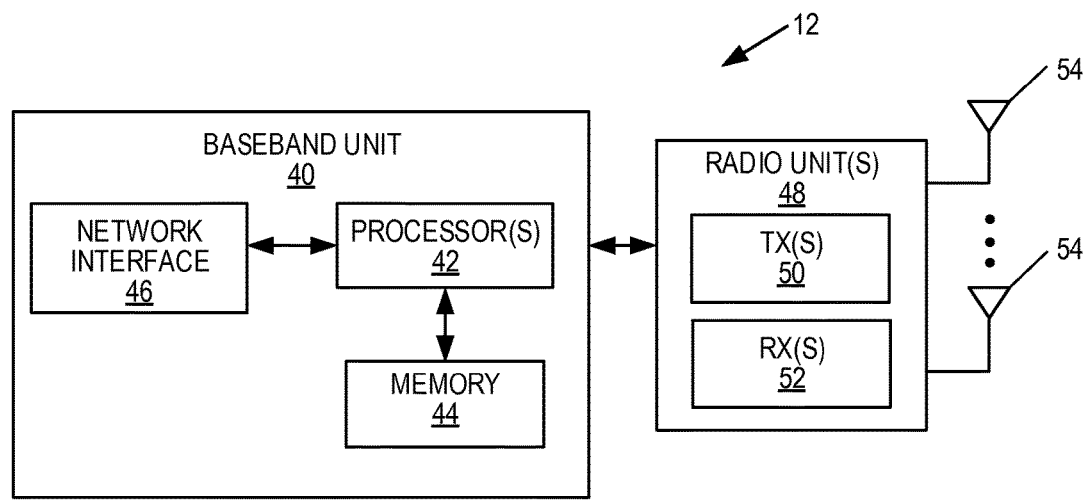
FIG. 10 illustrates one example of an LTE node (e.g., a base station or more generally a radio access node)

FIG. 10 illustrates one example of the LTE node 12. In this example, the LTE node 12 is a radio access node (e.g., an eNB). As illustrated, the LTE node 12 includes a baseband unit 40 including at least one processor 42 (e.g., at least one Central Processing Unit (CPU), Application Specific Integrated Circuit (ASIC), and/or Field Programmable Gate Array (FPGA)), memory 44, a network interface 46, and at least one radio unit 48 including one or more transmitters 50 and one or more receivers 52 coupled to one or more antennas 54. In some embodiments, the functionality of the LTE node 12 described herein is implemented fully or partially in software that is stored in the memory 44 and executed by the processor(s) 42. However, the present disclosure is not limited thereto. In other embodiments, some or all of the functionality of the LTE node 12 described herein is implemented in hardware. In some embodiments, some or all the functionality is performed at one or more network entities distinct from the LTE node 12.

Figure 11:
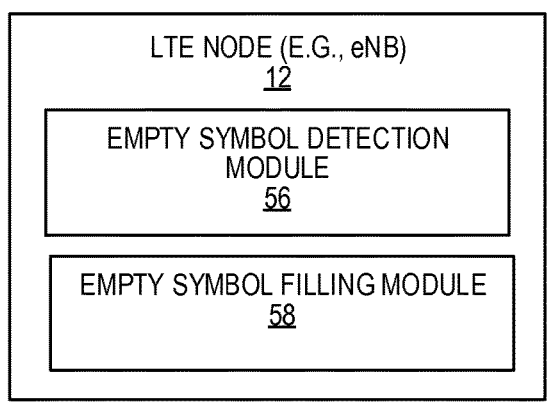
FIG. 11 illustrates another example of an LTE node (e.g., a base station or more generally a radio access node).

FIG. 11 illustrates another example of the LTE node 12. As illustrated, the LTE node 12 includes an empty symbol detection module 56 and an empty symbol filling module 58, each of which is implemented in software. The empty symbol detection module 56 operates to detect empty OFDM symbol(s) as described above. The empty symbol filling module 58 operates to fill the empty OFDM symbol(s) as described above. In some embodiments, the empty symbol filling module 58 only or selectively fills the empty OFDM symbol(s) that are X OFDM symbol times before protected OFDM symbols.

In some embodiments, a computer program including instructions which, when executed by at least one processor, causes the at least one processor to carry out the functionality of the LTE node 12 according to any of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 44).

The present disclosure provides systems and methods that mitigate or avoid grabbing of an unlicensed, or shared, frequency band utilized by a wireless communications network node (e.g., an LTE node) by a node of another wireless technology (e.g., WiFi) that operates according to a listen-before-talk scheme. In some embodiments, the wireless communications network is a wireless network that periodically stops all transmissions in order to allow other technologies to access radio channels in a spectrum shared with another wireless technology that operates according to a listen-before-talk scheme and the wireless communications network node is a node within this wireless network. In some embodiments, the wireless communications network is a 3GPP LTE network, and the wireless communications network node is an LTE node (e.g., an eNB). Further, in some embodiments, the other wireless technology is WiFi, and the node of the other wireless technology is a WiFi station.

In some embodiments, using LTE an example, the LTE node prepares signal mapping for an OFDM symbol. The LTE node then determines whether the OFDM symbol is empty and if the OFDM symbol is X OFDM symbol times before a protected OFDM symbol. For WiFi, the LTE node determines that the OFDM symbol is empty if the OFDM symbol is likely to be considered by WiFi stations as having received energy below the CCA level. Similar energy thresholds may be used for other wireless technologies that implement a listen-before-talk scheme. The value X is a predefined value that is greater than or equal to 1. In some embodiments, if there are multiples types of protected OFDM symbols, X may be different for at least some of the different types of protected OFDM symbols. If the OFDM symbol is empty and if the OFDM symbol is X OFDM symbol times before a protected OFDM symbol, the LTE node fills the OFDM symbol with additional data, which is sometimes referred to herein as dummy data. In some embodiments, the additional, or dummy, data may be data that is not to be decoded by any LTE UE or any WiFi station. In other embodiments, the additional, or dummy, data may be data that may be beneficial to a LTE UE and/or a WiFi station. In some embodiments, the additional or dummy data does not necessarily need to be a meaningful, decodable signal for the LTE UE and/or WiFi station, but only a signal that is observable by a receiver of the LTE UE and/or WiFi station (e.g., the signal has sufficient energy). The LTE node transmits the OFDM symbol, including the additional/dummy data if appropriate. In this manner, the LTE node can mitigate the chance that the carrier being used by the LTE node in the unlicensed, or shared, frequency band is detected by a WiFi station as being clear in the middle of an LTE radio frame. In other words, the LTE node mitigates or avoids WiFi grabbing of the carrier in the middle of an LTE radio frame.

The following acronyms are used throughout this disclosure.

μs Microsecond
3GPP 3$^{rd}$ Generation Partnership Project
ASIC Application Specific Integrated Circuit
CA Carrier Aggregation
CC Component Carrier
CCA Clear Channel Assessment
CFI Control Format Indicator
CPU Central Processing Unit
CQI Channel Quality Information
CRS Cell Specific Reference Symbol
CSI Channel State Information
DFT Discrete Fourier Transform
DTX Discontinuous Transmission
eNB Enhanced or Evolved Node B
FDD Frequency Division Duplexing
FDMA Frequency Division Multiple Access
FPGA Field Programmable Gate Array
LAA Licensed Assisted Access
LAA-LTE Licensed Assisted Access Long Term Evolution
LA-LTE Licensed Access Long Term Evolution
LTE Long Term Evolution
LTE Rel-8 Long Term Evolution Release 8
LTE Rel-10 Long Term Evolution Release 10
LTE-U Long Term Evolution Unlicensed
MAC Medium Access Control
MHz Megahertz
ms Millisecond
OFDM Orthogonal Frequency Division Multiplexing
PCell Primary Cell
PCFICH Physical Control Format Indicator Channel
PDCCH Physical Downlink Control Channel
PRB Physical Resource Block
PSCH Primary Synchronization Channel
PSS Primary Synchronization Channel
RE Resource Element
RRC Radio Resource Control
RRH Remote Radio Head
SCell Secondary Cell SC-FDMA Single Carrier Frequency Division Multiple Access
SSCH Secondary Synchronization Channel
SSS Secondary Synchronization Channel
TDD Time Division Duplexing
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of avoiding carrier grabbing in an unlicensed frequency band utilized by a cellular communications network, comprising:
   preparing a signal mapping for a symbol to be transmitted by the cellular communications network in the unlicensed frequency band;
   determining whether the symbol is an empty symbol, an empty symbol being a symbol that, whether or not all resource elements are empty, will be considered by a wireless node of another wireless technology that is sharing the unlicensed frequency band as a clear channel; and
   if the symbol is an empty symbol, filling the symbol with one or more additional signals prior to transmission by the cellular communications network such that the symbol is not an empty symbol.

2. The method of claim 1 further comprising:
   determining whether the symbol is within a predefined number of symbol periods prior to a protected symbol to be transmitted by the cellular communications network in the unlicensed frequency band, the predefined number of symbol periods being greater than or equal to 1;
   wherein filling the symbol with one or more additional signals comprises filling the symbol with the one or more additional signals if the symbol is an empty symbol and the symbol is within the predefined number of symbol periods prior to a protected symbol to be transmitted by the cellular communications network in the unlicensed frequency band.

3. The method of claim 2 wherein the predefined number of symbol periods is a function of protected symbol type.

4. The method of claim 2 wherein the predefined number of symbol periods is based on past statistics.

5. The method of claim 2 wherein the predefined number of symbol periods is based on at least one of a group consisting of: an observed probability of protected symbols and received interference power during protected symbols.

6. The method of claim 2 wherein the predefined number of symbol periods is based on channel load such that the predefined number of symbol periods increases as the channel load increases.

7. The method of claim 6 wherein the predefined number of symbol periods is further based on protected symbol type.

8. The method according to claim 1 wherein the cellular communications network is a Long Term Evolution, LTE, cellular communications network, and the symbol is an Orthogonal Frequency Division Modulation, OFDM, symbol.

9. The method of claim 8 wherein the protected symbol is one of a group consisting of: a Primary Synchronization Channel, PSCH, symbol; a Secondary Synchronization Channel, SSCH, symbol; a Physical Control Format Indicator Channel, PCFICH, symbol; and a Physical Downlink Control Channel, PDCCH, symbol.

10. The method of claim 1 wherein the symbol is an Orthogonal Frequency Division Modulation, OFDM, symbol, determining whether the symbol is an empty symbol comprises determining whether the symbol is an empty symbol based on at least one of a group consisting of: a ratio of unused resource elements to total available resource elements in the OFDM symbol and a power of the OFDM symbol.

11. The method of claim 8 wherein the other wireless technology is WiFi.

12. The method of claim 1 wherein the one or more additional signals are one or more additional signals that are not decoded or are not required to be decoded by any wireless device in the cellular communications network.

13. The method of claim 1 wherein the one or more additional signals are one or more additional signals that contain useful data for at least one of a group consisting of: one or more wireless devices in the cellular communications network and one or more wireless nodes operating according to the other wireless technology.

14. The method of claim 1 wherein the method is performed by one or more network nodes of the cellular communications network.

15. A network node of a cellular communications network operative to avoid carrier grabbing in an unlicensed frequency band utilized by the cellular communications network, comprising:
   circuit for preparing a signal mapping for a symbol to be transmitted by the cellular communications network in the unlicensed frequency band;
   circuit for determining whether the symbol is an empty symbol, an empty symbol being a symbol that, whether or not all resource elements are empty, will be considered by a wireless node of another wireless technology that is sharing the unlicensed frequency band as a clear channel; and
   circuit for filling the symbol, if the symbol is an empty symbol, with one or more additional signals prior to transmission by the cellular communications network such that the symbol is not an empty symbol.

16. A network node of a cellular communications network operative to avoid carrier grabbing in an unlicensed frequency band utilized by the cellular communications network, comprising:
   an empty symbol detection circuit operative to determine whether a symbol to be transmitted by the cellular communications network in the unlicensed frequency band is an empty symbol, an empty symbol being a symbol that, whether or not all resource elements are empty, will be considered by a wireless node of another wireless technology that is sharing the unlicensed frequency band as a clear channel; and
   an empty symbol filling circuit operative to, if the symbol is an empty symbol, fill the symbol with one or more additional signals prior to transmission by the cellular communications network such that the symbol is not an empty symbol.

17. A network node of a cellular communications network operative to avoid carrier grabbing in an unlicensed frequency band utilized by the cellular communications network, comprising:
   at least one processor; and
   memory containing instructions executable by the at least one processor whereby the network node is operative to:

prepare a signal mapping for a symbol to be transmitted by the cellular communications network in the unlicensed frequency band;

determine whether the symbol is an empty symbol, an empty symbol being a symbol that, whether or not all resource elements are empty, will be considered by a wireless node of another wireless technology that is sharing the unlicensed frequency band as a clear channel; and if the symbol is an empty symbol, fill the symbol with one or more additional signals prior to transmission by the cellular communications network such that the symbol is not an empty symbol.

* * * * *